UNITED STATES PATENT OFFICE.

WILHELM REISSIG, OF DARMSTADT, GERMANY, ASSIGNOR TO CONSTANTIN SCHMIDT, OF NEW YORK, N. Y.

STAMPING-INK.

SPECIFICATION forming part of Letters Patent No. 277,342, dated May 8, 1883.

Application filed August 18, 1882. (No specimens.) Patented in Germany August 30, 1881, No. 17,462.

*To all whom it may concern:*

Be it known that I, WILHELM REISSIG, of Darmstadt, a subject of the Emperor of Germany, and resident at Darmstadt, Germany, have invented new and useful Improvements in Stamping-Inks, of which the following is a specification.

Ordinary printers' ink consists of lamp-black and linseed-oil size or varnish, and stamping-ink is produced from the same by thinning it with boiled linseed-oil. If the said stamping-inks are not impressed into the paper very strongly, they can be removed, although sometimes this removal is attended with considerable difficulty. It is of great importance to use such stamping-ink as cannot be removed under any circumstances from papers of value—for instance, checks, postage-stamps, and other documents.

In order to produce such ink as cannot be eradicated, I mix with the above-mentioned ink, first, iron-oxide combinations hereinafter specified; second, oxidulated-iron combinations; third, metallic iron in the finest possible solution or powder. The iron-oxide salts form basic combinations when exposed to the air, and the metallic as well as the oxidulated combinations are oxidized to a still higher degree. A combination takes place between the above-mentioned materials and the sizing and cellulose of the paper, which combinations can always be traced, even when every appearance of the black color has been removed. The chemical reagent is most simple, and consists of sulphide of ammonium, which will immediately show any traces of iron, and will thus indicate any attempts that have been made to remove the ink.

My improved indelible stamping-ink consists of linseed-oil size or varnish, sixteen parts; best lamp-black, six parts; sesquichloride of iron, from two to five parts.

To use the ink for stamping, it is diluted by adding about one-eighth of the bulk of the ink of boiled linseed-oil size or varnish. The above-mentioned inks can only be used with rubber stamps, as metal stamps would be destroyed and oxidized. In order to avoid such destruction of metal stamps, I dissolve the above-named quantity of sesquichloride of iron in absolute spirits of wine, and add more than a sufficient quantity of iron powder to reduce the chloride, and then mix the rapidly-drying sesquioxide of iron with the above-mentioned printers' or other ink. Besides sesquioxide of iron, the following can also be used, to wit: iron sulphate, protoxalate-of-iron oxide. From the oxidul salts the protochloride of iron can be produced. The protosulphide of iron can be produced by the precipitation of iron vitriol with hydrosulphuret of ammonia, and the iron vitriol is produced perfectly free from water in a finely-powdered state; or all the above-named salts can be worked down by spirits of wine and mixed with metallic iron powdered, if desired.

Having thus described my invention, what I claim as new, and desire to secure by Letters Patent, is—

An indelible stamping-ink consisting of linseed-oil size or varnish, lamp-black, and an iron chloride or protochloride, substantially as herein described.

In testimony whereof I have signed my name to this specification in the presence of two subscribing witnesses.

WILHELM REISSIG.

Witnesses:
FRANZ HASSLACHER,
FRIEDRICH TAEGER.